United States Patent
Bisch et al.

(10) Patent No.: US 8,197,132 B2
(45) Date of Patent: *Jun. 12, 2012

(54) ELECTRONIC THERMOMETER WITH SELECTABLE MODES

(75) Inventors: Michael E. Bisch, Kirkwood, MO (US); Joseph T. Gierer, Glen Carbon, IL (US)

(73) Assignee: Covidien AG, Mansfield, MA (US)

( * ) Notice: Subject to any disclaimer, the term of this patent is extended or adjusted under 35 U.S.C. 154(b) by 509 days.

This patent is subject to a terminal disclaimer.

(21) Appl. No.: 12/463,767

(22) Filed: May 11, 2009

(65) Prior Publication Data

US 2009/0222236 A1    Sep. 3, 2009

Related U.S. Application Data

(63) Continuation of application No. 11/539,438, filed on Oct. 6, 2006, now Pat. No. 7,549,792.

(51) Int. Cl.
*G01K 7/00* (2006.01)

(52) U.S. Cl. ......... 374/169; 374/171; 374/172; 374/164

(58) Field of Classification Search ............. 374/169, 374/171, 172, 164; 600/549
See application file for complete search history.

(56) References Cited

U.S. PATENT DOCUMENTS

| | | |
|---|---|---|
| 2,227,938 A | 1/1941 | Krebs |
| 3,216,236 A | 11/1965 | Rohrbach |
| 3,245,248 A | 4/1966 | Ritter |
| 3,270,547 A | 9/1966 | MacRitchie et al. |
| 3,631,708 A | 1/1972 | Ensor |
| 3,702,076 A | 11/1972 | Georgi |
| 3,822,598 A | 7/1974 | Brothers et al. |
| 3,872,726 A | 3/1975 | Kauffeld et al. |
| 3,877,307 A | 4/1975 | Georgi |
| 3,921,453 A | 11/1975 | Platzer, Jr. |
| 3,978,325 A | 8/1976 | Goldstein et al. |
| 4,022,063 A | 5/1977 | West et al. |
| 4,050,289 A | 9/1977 | Fairbairn et al. |
| 4,068,526 A | 1/1978 | Goldstein |
| 4,075,882 A | 2/1978 | Waldron |
| 4,092,863 A | 6/1978 | Turner |
| 4,133,700 A | 1/1979 | Hollander et al. |
| 4,161,880 A | 7/1979 | Prosky |
| 4,183,248 A | 1/1980 | West |
| 4,206,649 A | 6/1980 | Nagaie |

(Continued)

FOREIGN PATENT DOCUMENTS

CN    1304032    7/2001

(Continued)

OTHER PUBLICATIONS

Extended European Search Report for Application No. 07117901.4 dated Feb. 28, 2008, 7 pp.

(Continued)

*Primary Examiner* — Lisa Caputo
*Assistant Examiner* — Mirellys Jagan
(74) *Attorney, Agent, or Firm* — Lisa E. Winsor

(57) ABSTRACT

An electronic thermometer is configured for selectable predictive modes based upon the same predictive algorithm. A mode selector is adapted for user selection between several modes of operation of the thermometer. Each mode of operation utilizes the same predictive algorithm for estimating the temperature of the subject before the thermometer reaches full equilibrium. Different modes offer users a selection for striking the appropriate balance between response time and precision, based upon user preferences and needs.

17 Claims, 4 Drawing Sheets

U.S. PATENT DOCUMENTS

| | | |
|---|---|---|
| 4,497,585 A | 2/1985 | Paull et al. |
| 4,523,859 A | 6/1985 | Bonnier et al. |
| 4,541,734 A | 9/1985 | Ishizaka |
| 4,559,954 A | 12/1985 | Murase |
| 4,565,456 A | 1/1986 | Iida et al. |
| 4,574,359 A | 3/1986 | Ishizaka et al. |
| 4,592,000 A | 5/1986 | Ishizaka et al. |
| 4,602,642 A | 7/1986 | O'Hara et al. |
| 4,602,871 A | 7/1986 | Hanaoka |
| 4,627,740 A | 12/1986 | Jerde et al. |
| 4,648,055 A | 3/1987 | Ishizaka et al. |
| 4,658,407 A | 4/1987 | Iwama |
| 4,673,300 A | 6/1987 | Wilhelmson et al. |
| 4,691,713 A | 9/1987 | Suzuki |
| 4,727,500 A | 2/1988 | Jackson et al. |
| 4,784,149 A | 11/1988 | Berman et al. |
| 4,794,076 A | 12/1988 | Founds, Jr. et al. |
| 4,797,840 A | 1/1989 | Fraden |
| 4,811,198 A | 3/1989 | Ota et al. |
| 4,819,249 A | 4/1989 | Ekstrom et al. |
| 4,832,504 A | 5/1989 | Hori et al. |
| 4,843,577 A | 6/1989 | Muramoto |
| 4,846,583 A | 7/1989 | Yamamoto |
| 4,866,621 A | 9/1989 | Ono |
| 4,877,333 A | 10/1989 | Ota et al. |
| 4,878,184 A | 10/1989 | Okada et al. |
| 4,885,463 A | 12/1989 | Wellman et al. |
| 4,900,162 A | 2/1990 | Beckman et al. |
| 4,901,257 A | 2/1990 | Chang et al. |
| 4,932,789 A | 6/1990 | Egawa et al. |
| 4,986,669 A | 1/1991 | Yamaguchi |
| 4,993,419 A | 2/1991 | Pompei et al. |
| 5,015,102 A | 5/1991 | Yamaguchi |
| 5,066,141 A | 11/1991 | Ikeda et al. |
| 5,144,814 A | 9/1992 | Gaudette |
| 5,150,969 A | 9/1992 | Goldberg et al. |
| 5,169,235 A | 12/1992 | Tominaga et al. |
| 5,183,337 A | 2/1993 | Pompei |
| 5,195,827 A | 3/1993 | Audy et al. |
| 5,229,612 A | 7/1993 | Pompei et al. |
| 5,246,293 A | 9/1993 | Luotsinen et al. |
| 5,259,389 A | 11/1993 | Muramoto et al. |
| 5,265,958 A | 11/1993 | Ludlow |
| 5,293,877 A | 3/1994 | O'Hara et al. |
| 5,328,264 A | 7/1994 | Krencker et al. |
| 5,333,784 A | 8/1994 | Pompei |
| 5,388,134 A | 2/1995 | Douglass et al. |
| 5,392,031 A | 2/1995 | Toriumi et al. |
| 5,473,629 A | 12/1995 | Muramoto |
| 5,531,377 A | 7/1996 | Thayer et al. |
| 5,608,838 A | 3/1997 | Brookley |
| 5,614,716 A | 3/1997 | Rupert et al. |
| 5,632,555 A | 5/1997 | Gregory et al. |
| 5,653,238 A | 8/1997 | Pompei |
| 5,678,923 A | 10/1997 | Germanow et al. |
| 5,713,668 A | 2/1998 | Lunghofer et al. |
| 5,725,308 A | 3/1998 | Smith et al. |
| 5,738,441 A | 4/1998 | Cambridge et al. |
| 5,767,792 A | 6/1998 | Urbas et al. |
| 5,795,063 A | 8/1998 | Christiaens et al. |
| 5,801,968 A | 9/1998 | Wu et al. |
| 5,874,736 A | 2/1999 | Pompei |
| 5,899,570 A | 5/1999 | Darmawaskita et al. |
| 5,967,992 A | 10/1999 | Canfield |
| 6,002,953 A | 12/1999 | Block |
| 6,033,109 A | 3/2000 | Huang |
| 6,056,435 A | 5/2000 | Pompei |
| 6,065,866 A | 5/2000 | Kraus et al. |
| 6,139,180 A | 10/2000 | Usher et al. |
| 6,149,298 A | 11/2000 | Kraus et al. |
| 6,155,712 A | 12/2000 | Egawa |
| 6,170,983 B1 | 1/2001 | Germanow et al. |
| 6,179,785 B1 | 1/2001 | Martinosky et al. |
| 6,193,411 B1 | 2/2001 | Chen |
| 6,232,614 B1 | 5/2001 | Christy et al. |
| 6,238,628 B1 | 5/2001 | Matsutani |
| 6,270,252 B1 | 8/2001 | Siefert |
| 6,371,925 B1 | 4/2002 | Imai et al. |
| 6,435,711 B1 | 8/2002 | Gerlitz |
| 6,447,160 B1 | 9/2002 | Fraden |
| 6,535,824 B1 | 3/2003 | Mansky et al. |
| 6,609,824 B1 | 8/2003 | Sato et al. |
| 6,629,776 B2 | 10/2003 | Bell et al. |
| 6,631,287 B2 | 10/2003 | Newman et al. |
| 6,641,299 B2 | 11/2003 | Sasajima et al. |
| 6,663,277 B1 | 12/2003 | Sandmael |
| 6,709,152 B1 | 3/2004 | Bronlund |
| 6,742,925 B2 | 6/2004 | Maccarone |
| 6,789,936 B1 | 9/2004 | Kraus et al. |
| 6,839,651 B2 | 1/2005 | Lantz et al. |
| 6,854,883 B2 | 2/2005 | Rund et al. |
| 6,865,407 B2 | 3/2005 | Kimball et al. |
| 6,900,721 B1 | 5/2005 | Urbas et al. |
| 6,908,224 B2 | 6/2005 | Schneider et al. |
| 6,939,035 B2 | 9/2005 | Machin |
| 6,964,515 B2 | 11/2005 | Asakura et al. |
| 6,971,790 B2 | 12/2005 | Quinn et al. |
| 7,036,978 B2 | 5/2006 | Tabata et al. |
| 7,063,458 B1 | 6/2006 | Tabata et al. |
| 7,108,419 B2 | 9/2006 | Harr |
| 7,181,357 B1 | 2/2007 | Rotem et al. |
| 7,209,775 B2 | 4/2007 | Bae et al. |
| 7,275,866 B2 | 10/2007 | Tseng |
| 7,289,927 B2 | 10/2007 | Bedard et al. |
| 7,297,938 B2 | 11/2007 | Fauci et al. |
| 7,318,004 B2 | 1/2008 | Butterfield |
| 7,347,621 B2 | 3/2008 | Sri-Jayantha et al. |
| 7,374,336 B2 | 5/2008 | Fraden |
| 7,399,116 B2 | 7/2008 | Takeuchi |
| 7,507,019 B2 | 3/2009 | Price |
| 7,549,792 B2 | 6/2009 | Bisch et al. |
| 7,549,797 B2 | 6/2009 | Myhre |
| 2002/0128791 A1 | 9/2002 | Chen et al. |
| 2002/0163955 A1 | 11/2002 | Yu |
| 2002/0191670 A1 | 12/2002 | Huang et al. |
| 2004/0047392 A1 | 3/2004 | Wu et al. |
| 2004/0057494 A1 | 3/2004 | Tsao et al. |
| 2005/0094705 A1 | 5/2005 | Chi |
| 2005/0249263 A1 | 11/2005 | Yerlikaya et al. |
| 2006/0039446 A1 | 2/2006 | Lee |
| 2007/0116089 A1 | 5/2007 | Bisch et al. |
| 2007/0160112 A1 | 7/2007 | Nanda |
| 2007/0189358 A1 | 8/2007 | Lane et al. |
| 2007/0268952 A1 | 11/2007 | Scott |
| 2007/0268954 A1 | 11/2007 | Reinders et al. |
| 2008/0298429 A1 | 12/2008 | Harr |
| 2009/0154519 A1 | 6/2009 | Price |

FOREIGN PATENT DOCUMENTS

| | | |
|---|---|---|
| CN | 1308225 | 8/2001 |
| DE | 2064292 | 7/1972 |
| DE | 29819056 U1 | 2/1999 |
| DE | 29907098 U1 | 7/1999 |
| DE | 20018955 | 3/2001 |
| EP | 0432262 B1 | 6/1991 |
| EP | 0446788 B1 | 9/1991 |
| EP | 0562039 B2 | 9/1993 |
| EP | 0593414 A2 | 4/1994 |
| EP | 0593415 A2 | 4/1994 |
| EP | 0763349 B1 | 3/1997 |
| EP | 0777114 A2 | 6/1997 |
| JP | 59018428 | 1/1984 |
| JP | 62156530 A | 7/1987 |
| JP | 63128235 A | 5/1988 |
| JP | 63191934 | 8/1988 |
| JP | 63275924 A | 11/1988 |
| JP | 03012527 A | 1/1991 |
| JP | 03020631 A | 1/1991 |
| JP | 06241911 A | 9/1994 |
| JP | 8114512 | 5/1996 |
| JP | 2675371 B2 | 11/1997 |
| JP | 2002022552 A | 1/2002 |
| JP | 200370750 A1 | 3/2003 |
| WO | 9806324 A1 | 2/1998 |
| WO | 0040939 A1 | 7/2000 |

| | | | |
|---|---|---|---|
| WO | 02103306 A2 | 12/2002 |
| WO | 03087885 A2 | 10/2003 |
| WO | 2005040743 A1 | 5/2005 |

OTHER PUBLICATIONS

Greenes, David et al., "Accuracy of Noninvasive Temporal Artery Thermometer for use in Infants", Archives of Pediatrics & Adolescent Medicine vol. 155 No. 3, <http://archpedi.ama-assn.org/cgi/content/full/155/3/376>, Mar. 2001, 11 pp.

Solvay Solexis, Inc., Galden DET, Material Safety Data Sheet, 2004, 4 pp.

Solvay Solexis, Inc., Galden PFPE: Reliability Testing Fluids, Product Data Sheet, <http://www.solvaysolexis.com>, Nov. 3, 2005, 4 pp., Solvay Solexis S.p.A. (Italy), Europe.

Isothermal Technology Ltd., "Infrared Calibration: Blackbody Fixed Point Cells", <http://www.isotech.co.uk/bbody/tympanic.html>, Nov. 2, 2005, 2 pp.

Perkinelmer, "Thermoelectric Infrared Sensors (Thermopiles) for Remote Temperature Measurements", Pyrometry, Jul. 11, 2000, pp. 1-12.

Thermoscan, Inc., Infrared Temperature Reference, Operator's Manual: Model IR-3000, 1992, 6 pp., San Diego, California, United States.

Isothermal Technology, Ltd., Infrared Tympanic Thermometer Validation System, at least as early as Nov. 2005, 2 pp.

Tyco Healthcare, First Temp Genius, Mar. 2002, 2 pp., Gosport, Hampshire, United Kingdom.

Tyco Healthcare, Temperature Monitoring, Jan. 2000, 12 pp., Gosport, Hampshire, United Kingdom.

Dexter Research Center, Inc., "ST60 TO-5" [Online] XP002449050, <http://web.archive.org/web/20060215204354/www.dexter-research.com/products/st60-to5.html>, pp. 1-2.

Dexter Research Center, Inc., "Thermistor Options" [Online] XP002449051, <http://web.archive.org/web/20060127085339/www.dexterresearch.com/products/downloads/thermisters.pdf>.

ILX Lightwave: "Thermistor calibration and the Steinhart-Hart Equation" Application Note #4, Sep. 2003, XP002449052, pp. 2-4.

Hart Scientific Model 9135 (1999) <http://web.archive.org/web/19990922025859/http://www.hartscientific.com/products/9135.htm>.

Office action dated Feb. 28, 2008 from related U.S. Appl. No. 11/539,438, 11 pgs.

Response filed Jul. 29, 2008 to Office action dated Feb. 28, 2008 in related U.S. Appl. No. 11/539,438, 13 pgs.

Office Action dated Dec. 16, 2008 from related U.S. Appl. No. 11/539,438, 14 pgs.

Response filed Feb. 2, 2009 to Office action dated Feb. 16, 2008 in related U.S. Appl. No. 11/539,438, 2 pgs.

ELECTRONIC THERMOMETER WITH SELECTABLE MODES

CROSS-REFERENCE TO RELATED APPLICATION

This a continuation of U.S. patent application Ser. No. 11/539,438 filed Oct. 6, 2006, the entire disclosure of which is incorporated herein by reference.

BACKGROUND

Aspects of the invention pertain generally to the field of electronic thermometers and more particularly to the field of fast response electronic thermometers employing a sensor probe.

Electronic thermometers are widely used in the healthcare field for measuring patient's body temperature. Typical electronic thermometers have the form of a probe with an elongated shaft portion. Electronic temperature sensors such as thermistors or other temperature-sensitive elements are contained within the shaft portion. Additional electronics connected to the electronic sensor components may be contained within a base unit connected by wire to the shaft portion or may be contained within a handle of the shaft portion, for example. Electronic components receive input from the sensor components to compute the patient's temperature. The temperature is then typically displayed on a visual output device such as a seven, or fourteen, segment numerical display device. Additional features of known electronic thermometers include audible temperature level notification such as a beep or tone alert signal. A disposable cover or sheath is typically fitted over the shaft portion and disposed after each use of the thermometer for sanitary reasons.

Electronic thermometers have many advantages over conventional thermometers and have widely replaced the use of conventional glass thermometers in the healthcare field. For example, electronic thermometers do not require costly sterilization procedures and do not present the dangers associated with mercury or broken glass causing injury to a patient. Furthermore, electronic thermometers generally have a faster response time than glass thermometers and provide very precise and accurate temperature measurement information.

Despite the response time improvements over glass thermometers, some known electronic thermometers have unacceptably long response time. The long response time is primarily due to the thermal mass of the probe together with the sensor components. The thermal mass of the probe and the sensor components may take several minutes to reach the actual body temperature of the patient being measured. The thermal mass of the probe typically begins a measurement cycle at a lower temperature than the patient being measured and absorbs heat from the patient until the patient and the thermal mass of the probe reach thermal equilibrium. Therefore, the thermal mass of the probe prevents the sensor temperature from instantaneously reaching a patients body temperature.

Electronic thermometers in the art are known having improved response times that are achieved using a number of different techniques. One technique known in the art employs thermally conductive material such as metal in the probe tip between the patient contact area and the temperature sensor. Another technique uses a very thin layer of material between the patient contact area and the temperature sensors. Both of these techniques improve response time somewhat but still allow time to be wasted while heat from the patient flows to the thermal mass of the probe instead of the temperature sensors.

Previously known electronic thermometers have employed electric heater elements in the probe shaft to bring the temperature of the thermal mass of the probe shaft and probe tip closer to the temperature of the patient prior to taking temperature measurements. Temperature sensor readings are used in known methods to control electric current to the heater element. Time is saved because less heat must be transferred from the patient to the thermal mass of the probe before the temperature sensors reach thermal equilibrium with the patient.

The response time of electronic thermometers has also been improved by methods that do not involve heating the probe shaft or tip. Predictive type thermometers are known for example, wherein a set of early temperature measurements are read by the electronics of the thermometer and a mathematical algorithm is applied to extrapolate to a final estimated equilibrium temperature. Various prediction type thermometers are known which improve response time and provide accurate temperature estimations. Still other methods of improving the response time of electronic thermometers are known which combine heating methods with prediction methods. For example, one predictive-type clinical thermometer automatically switches between a plurality of prediction functions to determine a final predicted temperature. The thermometer monitors the measured results of the thermometer for a set time before applying an initial predictive function to the measured results. The thermometer then monitors the ability of the initial predictive function to predict the measured results. Where the measured temperature results do not follow the initially applied prediction function, the thermometer automatically selects another prediction function. Again, the thermometer monitors the ability of this other prediction function to predict the measured results. This process of monitoring and switching to another of a plurality of predictive functions continues until the thermometer determines that a satisfactory prediction is achieved or that a time limit is reached. In other words, without user input or control, the thermometer can select to apply several different predictive functions throughout a single measurement process. This automatic switching from one predictive function to another can add measurement time and ignores any user preference or input regarding desirable prediction time or required accuracy.

Disadvantages of known thermometers leave room for improvement. For example, some thermometers still suffer from relatively long response times, as judged by the user of the thermometer. For prediction algorithms, the goal of decreased response time opposes the goal of increased precision. As response time is reduced, precision decreases, and vice versa. Thus, known thermometer designers have had to make a design choice for the user, constructing thermometers that compromise between decreased response time and increased precision. The problem with making such a choice for all applications, however, is that different thermometer applications may have different requirements and goals. For example, some applications require a very short response time, but do not require an extremely high level of precision. In contrast, other applications do not require a short response time, but do require an extremely high level of precision. Conventional thermometers ignore these user preferences and may spend more time than a user would prefer obtaining a predicted temperature. Conversely, a conventional thermometer may not spend adequate time determining a predicted temperature of sufficient accuracy. A thermometer that allowed the user to determine and adjust the balance between response time and precision based upon the thermometer application would be useful.

SUMMARY

A prediction type electronic thermometer embodying aspects of the invention is configured to allow user selection of the desired response time of the thermometer and the desired precision of the temperature readings. In one exemplary embodiment of the present invention, the application of a particular prediction algorithm provides a user with control over the desired precision and the thermometer response time. A user may select how the data collected by the electronic thermometer is applied to the prediction algorithm, thereby selecting where the compromise between the countervailing goals of increased precision and reduced response time is maintained.

In one aspect, an electronic thermometer comprises a probe adapted to be heated by a subject for use in measuring the temperature of the subject. The electronic thermometer also comprises at least one temperature sensor for detecting the temperature of the probe. The electronic thermometer further comprises a processor configured for user selection between at least a first predictive mode of operation of the thermometer and a second predictive mode of operation of the thermometer. In the second mode, the thermometer determines temperature more slowly but with greater precision as compared with the first mode. The first mode of operation utilizes the predictive algorithm for estimating the temperature of the subject before the thermometer reaches full equilibrium with the subject based on a plurality of samples of the temperature of the probe detected by the temperature sensor. The second mode of operation utilizes the same predictive algorithm for estimating the temperature of the subject before the thermometer reaches full equilibrium with the subject based on the plurality of samples of the temperature of the probe detected by the temperature sensor and an additional plurality of samples of the temperature of the probe detected by the temperature sensor.

In another aspect, a method for determining the temperature of a subject with an electronic thermometer is disclosed. The method comprises receiving from a user of the electronic thermometer a selection between at least a first mode of operation of the thermometer and a second mode of operation of the thermometer. The method further comprises collecting temperatures of the subject measured by the thermometer over time and applying a first portion of the collected measured temperatures to a predictive algorithm according to the first mode of operation, when the selection received from the user is for a first mode of operation. The method further comprises applying the first portion and a second portion of the collected measured temperatures to the same predictive algorithm according to the second mode of operation, different from the first mode of operation, when the selection received from the user is for a second mode of operation. The method further comprises estimating the temperature of the subject with the predictive algorithm based upon the selected mode of operation before the electronic thermometer reaches equilibrium with the temperature of the subject.

In still another aspect, a method for determining the temperature of a subject with an electronic thermometer comprises receiving from a user of the electronic thermometer a selection of one of a plurality of predictive modes of operation of the thermometer. The plurality of predictive modes of operation are selectable along a continuum from a shortest measurement duration and a standard-precision measurement to a longest measurement duration and a highest-precision measurement. The method further comprises collecting temperatures of the subject measured by the thermometer over time and applying at least some of the collected measured temperatures to a predictive algorithm determined according to the predictive mode of operation selected by the user, where a fewer number of the collected measured temperatures are applied to the predictive algorithm for standard-precision measurement than for the highest-precision measurement. The method further comprises estimating the temperature of the subject with the predictive algorithm based upon the selected predictive mode of operation.

Other exemplary features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION

Figure 1:
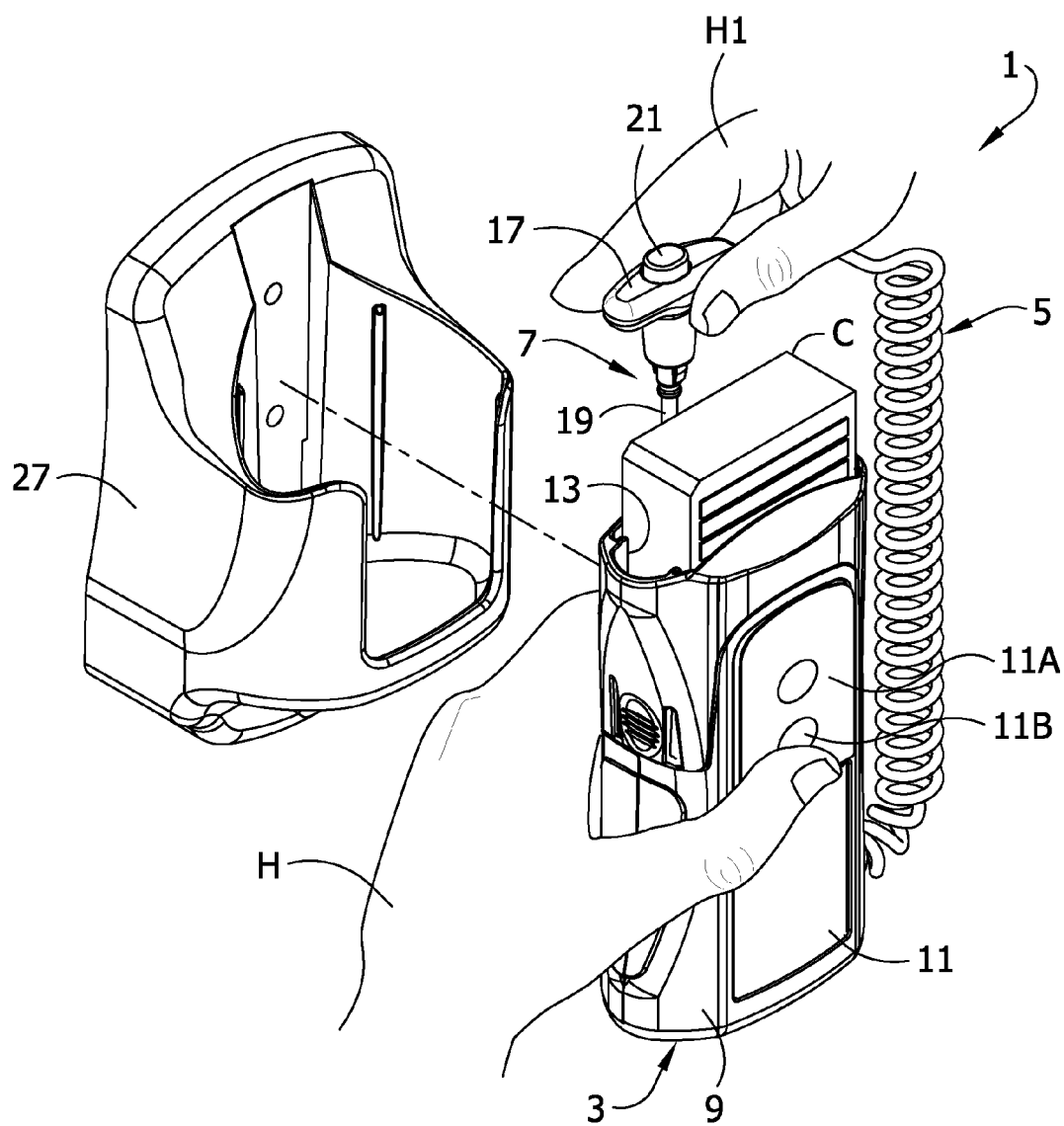
FIG. 1 is a perspective of an electronic thermometer of one embodiment of the invention.
Figure 2:
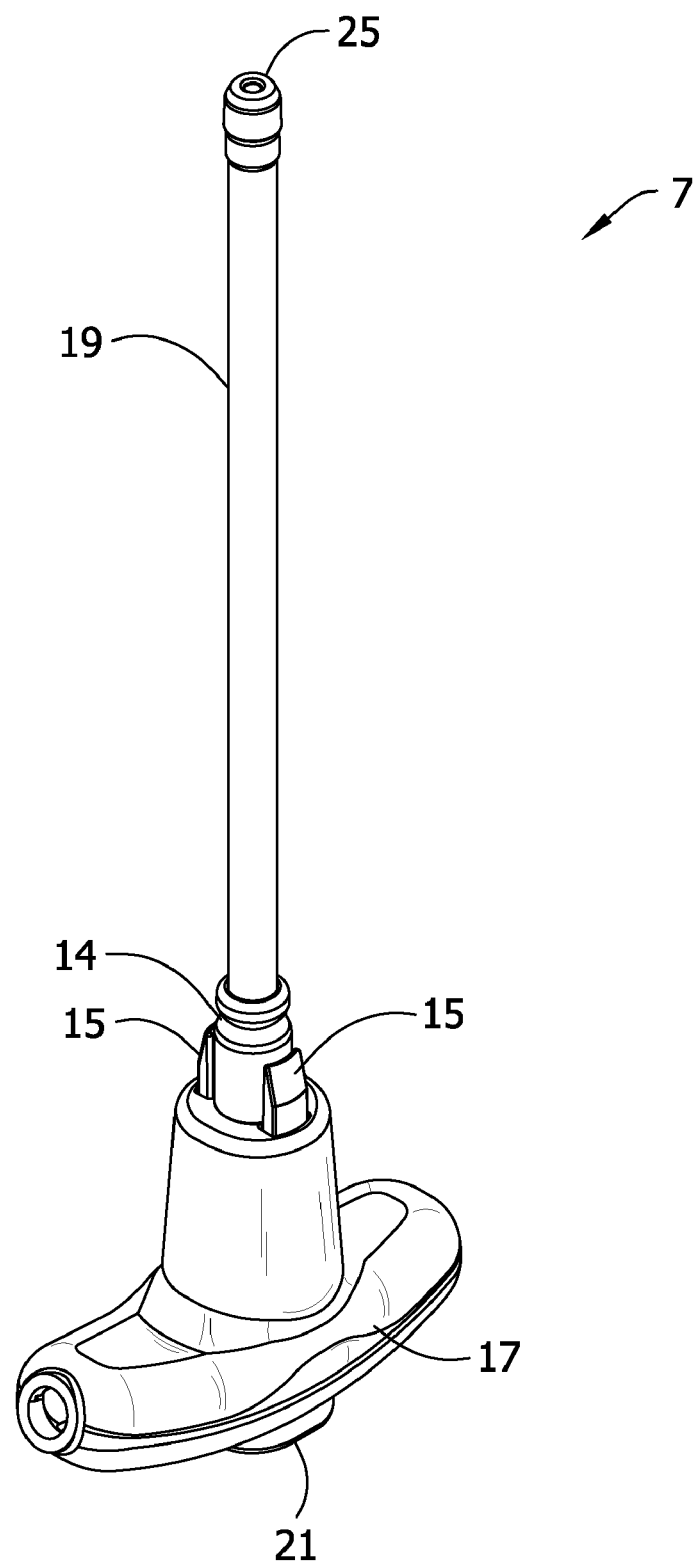
FIG. 2 is a perspective of a probe of the electronic thermometer of FIG. 1.

Referring now to the drawings and in particular to FIGS. 1 and 2, an electronic thermometer constructed according to the principles of the present invention is indicated generally at 1. The electronic thermometer comprises a temperature calculating unit, indicated generally at 3, that is sized and shaped to be held comfortably in the hand H. The calculating unit 3 (broadly, "a base unit") is connected by a helical cord 5 to a probe 7 (the reference numerals indicating their subjects generally). The probe 7 is constructed for contacting the subject (e.g., a patient, not shown) and sending signals to the calculating unit 3 representative of the temperature. The calculating unit 3 receives the signals from the probe 7 and uses them to calculate the temperature. Suitable circuitry for performing these calculations is contained within a housing 9 of the calculating unit 3. The logic in the circuitry may include a predictive algorithm for rapidly ascertaining the final temperature of the patient according to two or more modes of operation, as will be discussed in greater detail below. The circuitry makes the calculated temperature appear on a display 11 (e.g., an LCD display) on the front of the housing 9. Other information desirably can appear on the display 11, as will be appreciated by those of ordinary skill in the art, and discussed in greater detail below with reference to the display of FIG. 3. A panel 11A of buttons, or other user interface devices (e.g., switches, toggles, knobs, dials, touch screens, keypads, etc.) for operating the thermometer 1 is located just above the display 11. As would be readily understood by one skilled in the art, other arrangements of the display and panel can be utilized without departing from the scope of embodiments of the invention.

Referring again to FIGS. 1 and 2, the housing 9 includes a compartment, or slot, (not shown) generally at the rear of the housing that can receive a distal portion of the probe 7 into the housing for holding the probe and isolating the distal portion from the environment when not in use. FIG. 1 illustrates the probe 7 being pulled by the other hand H1 from the compartment in preparation for use. The housing 9 also has a receptacle 13 that receives a suitable container, such as a carton C of probe covers. In use, the top of the carton C is removed (not shown), exposing open ends of the probe covers. The distal portion of the probe 7 can be inserted into the open end of the carton C and one of the probe covers can be captured (e.g., snapped into) an annular recess 14 (FIG. 2). Ejection members 15 are located at the junction of a handle 17 of the probe 7 with a probe shaft 19. The probe shaft is protected from contamination by the cover when the distal portion of the probe shaft 19 is inserted, for example, into a patient's mouth. A button 21 on the probe handle 17 can be depressed to cause the ejection members 15 to move for releasing the probe cover from the probe shaft 19. Subsequent to use, the probe cover can be discarded. Other ways of capturing and releasing probe covers may be used without departing from the scope of the present invention.

In use, a metal tip 25 (e.g., aluminum) at the distal end of the probe shaft 19 is heated up by the patient and the temperature of the tip is detected, as will be described more fully hereinafter. The probe cover is preferably made of highly thermally conductive material, at least at its portion covering the tip 25, so that the tip can be rapidly heated by the patient. The tip 25 also includes a heater element (not shown) used to heat the probe 7 to near the temperature of the patient to provide a faster response time for the thermometer. One or more temperature sensors, such as a tip temperature sensor and a proximal temperature sensor may be disposed within the probe for connection to a temperature prediction component (not shown). In at least one embodiment, the temperature sensors are connected to a microprocessor system which performs the functions of both a heater control circuit and a temperature prediction component. The proximal temperature sensor provides a signal indicative of the heater temperature for use by the heater control circuit in computing a heater current control value. The proximal temperature sensor may also provide a signal indicative of the heater temperature for use in a temperature prediction algorithm.

The base unit 3 houses a power supply and electronics for the heater control circuit and the temperature prediction component. The helical cord 5 carries power from the base unit 3 to the probe 7. While not in use, the probe 7 may be stored within the slot in the base unit 3. In at least one embodiment of the invention, the slot may include a switch to trigger initiation of the heater control circuit so that the heater element may be powered up beginning when the probe 7 is removed from the base unit 3. The electronic thermometer 1 also includes a docking station 27 for receiving the temperature calculating unit 3, such as for storing the temperature calculating unit, recharging of the power supply, establishing communication between the thermometer and the docking station, and securing the temperature calculating unit, among others.

Generally, input from the temperature sensors in the probe 7 is used by a temperature prediction algorithm to determine a predictive temperature and output the temperature to the display 11. In at least one embodiment, interim output display signals are continuously updated as the temperature sensors reach equilibrium. In an alternative embodiment, no output is displayed until after a temperature reading is determined according to a mode of operation selected by the user. The temperature prediction algorithm monitors the probe 7 temperature in time and then uses that information to predict the final stabilization temperature. The prediction algorithm can take many forms and may be based upon many variables, such as heater temperature, probe tip temperature, probe cover temperature, skin temperature, body temperature, tissue capacitance, cover capacitance, probe tip capacitance, body skin resistance, skin-cover resistance, cover-probe resistance, probe-heater resistance, and time, among others. As an example of such a prediction algorithm, Applicants hereby incorporate by reference co-assigned U.S. application Ser. No. 09/893,154, entitled Probe Tip Thermal Isolation and Fast Prediction Algorithm, issued Jan. 4, 2005 as U.S. Pat. No. 6,839,651. One skilled in the art would readily understand how to create and implement such a prediction algorithm with reference to the above-noted application.

Referring again to the panel 11A of the electronic thermometer 1 depicted in FIG. 1, one exemplary embodiment of the electronic thermometer also comprises a mode selector 11B adapted for user selection between a first mode of operation of the thermometer and a second mode of operation of the thermometer. Each of the first and second modes of operation utilizes the same predictive algorithm for estimating the temperature of the subject before the thermometer 1 reaches full equilibrium with the subject. Generally speaking, prediction algorithms are utilized to achieve a primary goal of decreased response time. The goal of decreased response time, however, opposes the goal of increased thermometer precision. Generally, as response time is reduced, precision decreases, and vice versa. The first and second modes discussed herein allow a user to select between the first and second modes, which each feature a different balance between speed and precision. In the present example, the thermometer 1 determines the temperature in the first mode of operation more quickly, as compared with the second mode of operation. Because the temperature is determined more quickly, it is also determined with less precision, as compared with the second mode of operation. For particular applications, however, such a level of precision is sufficient, and preferable because of the decreased time required to estimate such a temperature.

Figure 3:
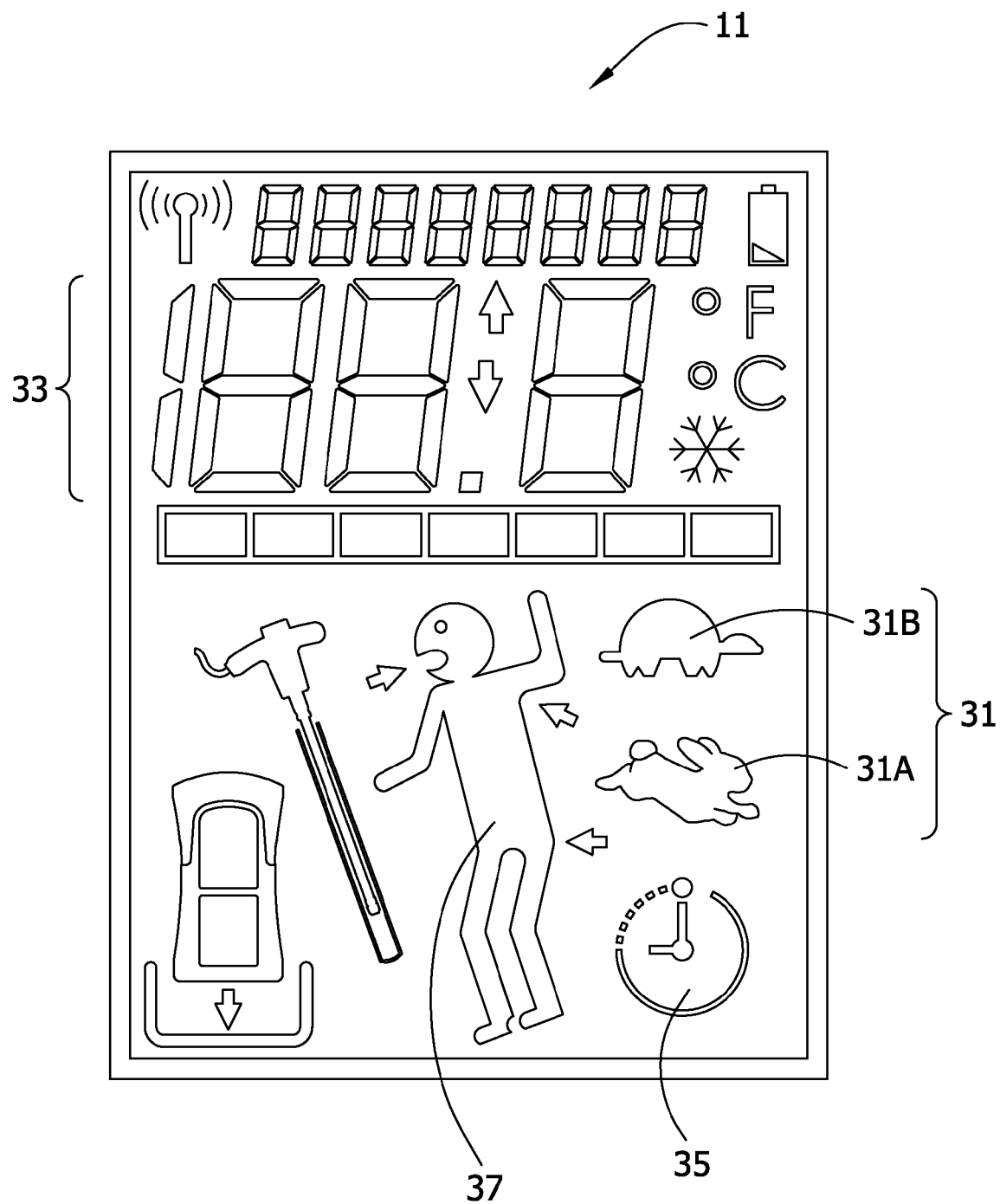
FIG. 3 is an exemplary display of the electronic thermometer of FIG. 1.

Referring now to FIG. 3, the exemplary display 11 will be described in further detail. In the present example, the display 11 of the electronic thermometer 1 comprises a visual indicator 31 indicating the mode of operation selected by the user. The visual indicator 31 includes two portions, a first mode indicator 31A and a second mode indicator 31B. Each of the indicators is represented by a particular icon, indicative of the type of mode selected by the user. For example, because the first mode determines the temperature more quickly, the first mode indicator 31A is depicted as a rabbit, while the second mode is depicted with no icon. This icon serves as a reminder to the user regarding the characteristics of the selected mode. The visual indicator 31 also includes a direct mode indicator 31B for indicating that the thermometer is functioning in the direct mode whereby no prediction algorithm is utilized. The display 11 can include other features, such as a numeric display 33 (e.g., a seven, or fourteen-segment display device) for displaying temperature, a timer icon display 35 for displaying when a pulse timer is being used, a body site icon 37 for displaying the current setting for the portion of the subject being tested, and a probe icon 39 for indicating when a probe cover should be installed or removed. Other features may be incorporated into the display 11 without departing from the scope of the embodiments of the present invention.

In still another exemplary embodiment, the mode selector 11B is adapted for selecting between a plurality of predictive modes of operation of the thermometer 1. As described in greater detail below with respect to the exemplary methods of the present invention, the plurality of predictive modes of operation are arranged for selection along a continuum from a shortest measurement duration and a standard-precision measurement to a longest measurement duration and a highest-precision measurement. In this manner, manipulation of the mode selector 11B is relatively straightforward, allowing the user to appreciate that moving one direction on the continuum will lead to shorter measurement duration and average precision, while moving in the opposite direction on the continuum will lead to longer measurement duration and higher precision. Each of the plurality of predictive modes of operation utilizes the same predictive algorithm for estimating the temperature of the subject before the thermometer reaches full equilibrium with the subject. By applying different data to the same predictive algorithm, temperature estimates of varying precision and data collection duration may be achieved. This exemplary embodiment also includes a visual indicator indicating the mode of operation selected by the user, similar to the visual indicator 31 of FIG. 3. As would be understood by one skilled in the art, a visual indicator associated with the present embodiment would require more than three portions, but could be designed in a similar manner, demonstrating the continuum described above.

For the present embodiment, the mode selector 11B itself may be formed in a number of different ways. For example, the mode selector 11B may comprise a rotary dial (not shown) adapted to be rotated to a plurality of positions corresponding to the plurality of predictive modes of operation. In another example, the mode selector 11B may comprise a movable selector (not shown) adapted to be moved to a plurality of positions corresponding to the plurality of predictive modes of operation. In still another example, the mode selector 11B may comprise a plurality of buttons, each button corresponding to one of the plurality of predictive modes of operation. In any event, any type of mode selector 11B adapted for selecting each the plurality of predictive modes may be utilized without departing from the scope of the present embodiment.

Figure 4:
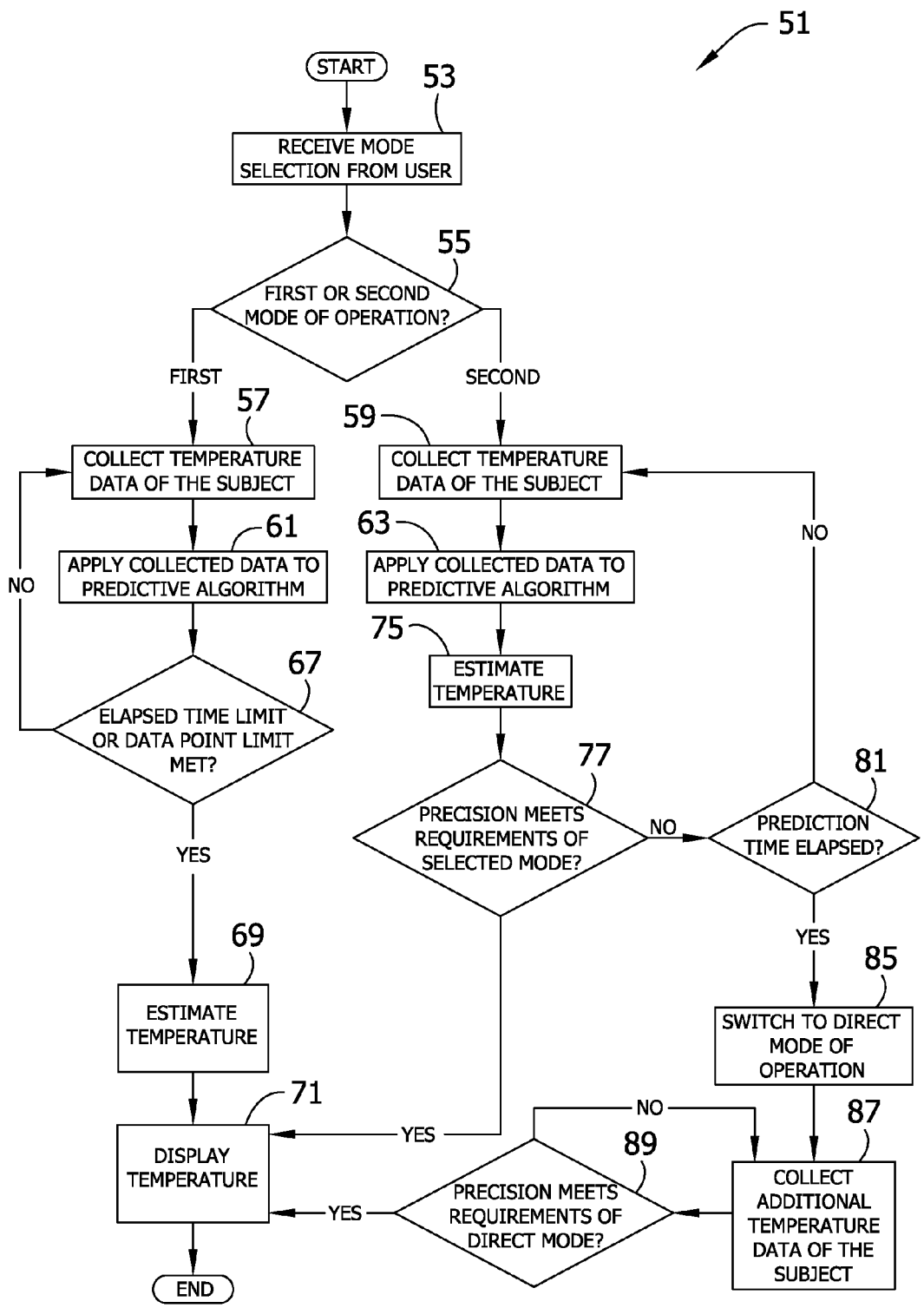
FIG. 4 is a flow diagram of a method of one embodiment of the invention.

Turning to the embodied method of the present invention, a method for determining the temperature of a subject with an electronic thermometer 1 utilizing a two-mode thermometer operation is generally depicted as 51 in FIG. 4. The method 51 comprises receiving, at 53, from a user of the electronic thermometer 1 a selection between at least a first mode of operation of the thermometer and a second mode of operation of the thermometer. As discussed generally above, the first mode and second mode of the thermometer apply different collected data to the same predictive algorithm. Once selected, the method 51 decides, at 55, whether the mode is based upon elapsed collection time or a total number of data points collected (e.g., the first mode of operation) or is based upon meeting an enhanced precision determination (e.g., the second mode of operation).

In either mode, the method 51 further comprises collecting, at 57 and 59, temperatures of the subject measured by the thermometer over time. The collecting 57, 59 can occur at a constant rate (e.g., each 0.188 seconds) or at any number of defined or random intervals, each associated with a particular time.

Where the mode selected is based upon elapsed collection time or a total number of data points collected (e.g., the first mode of operation), the method 51 further applies, at 61, at least some of the collected 57 measured temperatures to the predictive algorithm according to the first mode of operation. Alternately, where the mode selected is not based upon elapsed collection time or a total number of data points collected (e.g., the first mode of operation), but rather is based upon some other criteria (e.g., precision of the temperature estimation), the method 51 applies, at 63, at least some of the collected 59 measured temperatures to the same predictive algorithm according to the second mode of operation, different from the first mode of operation. The first and second modes of operation can differ in any number of ways without departing from the scope of embodiments of the present invention. In one example, the applying 61 at least some of the collected measured temperatures to the predictive algorithm according to the first mode of operation comprises applying fewer measured temperatures to the predictive algorithm according to the first mode of operation, as compared with the number of measured temperatures applied to the same predictive algorithm according to the second mode of operation. In other words, the first mode of operation collects fewer data points, or collects data for a shorter time, than the second mode of operation. Collecting fewer data points or collecting data over a shorter period provides a faster response, while providing adequate precision. Alternately, the second mode functions according to the precision of the present prediction, which may provide a response in a suitable, yet longer, time with enhanced precision.

Continuing with the first mode, the method 51 continues by determining, at 67, if the collection time limit has elapsed or the data point limit has been reached. For example, the method 51 can determine if the method collected N number of measured temperatures. In another example, the method 51 can determine if collection 57 has occurred continuously for at least about S number of seconds. If no is the answer to either of these inquiries, the method 51 returns to the collecting 57. But if yes, enough data has been collected or adequate time for data collection has passed, and the method 51 terminates, or truncates, the collecting 57 of temperatures and continues with estimating, at 69, the temperature of the subject with the predicted algorithm by applying the N number of collected measured temperatures or the collected measured temperatures collected for at least about S number of seconds. In this first mode of operation, the predictive algorithm estimates 69 the equilibrium temperature with the data collected thusfar, without regard for the precision or accuracy of the estimated temperature. Such an estimate 69 is in accordance with instructions from the user in selecting the first mode of operation. This termination of the collecting 57 process is counterintuitive, as the conventional wisdom in temperature monitoring is to strive to collect more and more data in a shorter amount of time to improve both the precision and speed of the measurement. Terminating the collection of temperature data and proceeding to estimate the temperature with only the data collected up to that point in time provides a thermometer capable of adequate precision, while providing results in a very short time period. In other words, by restricting data collection to a particular length of time, thermometer response time is improved and thermometer performance is adequate for the associated application. In an alternative embodiment, aspects of the invention may apply reasonable bounds on the measurements to prevent reporting clearly erroneous readings. For example, if the truncated prediction yields a temperature measurement less than 60° F. or greater than 120° F., the prediction algorithm evaluates one or more additional data samples and adjusts the predicted measurement accordingly.

In a more specific example, the estimating 69 occurs when at least fourteen measured temperatures have been collected. Where temperature measurements occur at 0.188 second intervals, the temperature is estimated at about 2.6 seconds. In another specific example, the estimating 69 occurs when temperature measurements have occurred continuously for at least about 2.6 seconds. With the temperature estimate determined, the method displays, at 71, the estimated temperature for the user. In one example, the method further sounds an alarm (not shown) when displaying 71 the estimated temperature to alert the user that the displayed temperature meets the criteria of the selected mode of operation.

Returning to the second mode of operation, the method 51 has already collected 59 the temperatures of the subject measured by the thermometer over time and applied 63 the collected measured temperatures to the same predictive algorithm as the first mode of operation, but according to the second mode of operation. In particular, the method 51 continues by estimating, at 75, the temperature of the subject according to the second mode of operation. The method 51 continues by determining, at 77, if these temperature estimates meet the precision requirements of the second mode of operation. In one example, the estimate of the predictive algorithm must converge to a precision meeting a minimum threshold. For example, final temperature estimates are calculated according to the temperature prediction algorithm, including determining a goodness criterion.

If the goodness criterion indicates that the prediction is acceptably precise, then the thermometer 1 displays 71 the estimated temperature. Alternately, if the goodness criterion indicates that the prediction is not acceptably precise, then the heating element continues to receive power, the temperature sensors continue to collect data, and the thermometer 1 returns to collecting 59 more data. Utilizing such a predictive algorithm in the second mode of operation, a time of about 4 to 11 seconds is needed to present a final prediction of temperature. Depending upon particular variables, the appropriate prediction time may range from 3.2 seconds to about 30 seconds. As an example of such a prediction algorithm utilizing a goodness criteria, Applicants hereby reference co-assigned U.S. application Ser. No. 09/893,154, entitled Probe Tip Thermal Isolation and Fast Prediction Algorithm, issued Jan. 4, 2005 as U.S. Pat. No. 6,839,651.

In addition to the first and second modes discussed above, the method 51 also contemplates an additional direct mode that may be invoked manually, such as by user selection, or automatically, such as when the predictive mode is unable to provide an acceptable estimate within a specified time period. As shown in FIG. 4, if the goodness criterion indicates that the prediction is not acceptably precise, the method 51 does not automatically return to collecting 59 more data. Instead, the method 51 determines, at 81, if a prediction time limit has elapsed. Where the time limit has not elapsed, the method returns to the collecting 59, applying 63, estimating 75, and determining 77 to continue seeking an estimated temperature meeting the precision requirements. Where the time limit has elapsed, the method 51 switches, at 85, to a direct mode of operation. The direct mode collects, at 87, temperature data and determines, at 89, if the collected readings meet the requirements of the direct mode of operation. In one example, the direct mode does not apply the predictive algorithm, but simply collects temperature information until the temperature equilibrates with the subject. This method is highly accurate, but can take significant time, as the probe 7 must completely equilibrate to the subject.

A short summary comparison of the first and second modes follows. Utilizing the same prediction algorithm, estimating the temperature of the subject based upon the first mode of operation occurs more quickly, as compared with the second mode of operation. Put another way, estimating the temperature of the subject with the predictive algorithm based upon the second mode of operation occurs with greater precision, as compared with the first mode of operation.

These methods are applicable to collecting temperatures of a subject and estimating the temperature of a subject. As would be understood by one skilled in the art, these methods are readily applicable to collecting temperatures of a patient measured by the thermometer over time and estimating the temperature of the patient with the predictive algorithm based upon the selected mode of operation. Other subjects, such as animals, test apparatus, and other devices requiring measurement may also be subject to the disclosed methods without departing from the scope of embodiments of the invention.

Embodiments of the present invention further contemplate a method including a plurality of predictive modes. Where similarities exist between this method and the previously described method, references will be made to FIG. 4. Such a method comprises receiving 53 from a user of the electronic thermometer 1 a selection of one of a plurality of predictive modes of operation of the thermometer. The plurality of predictive modes of operation are arranged for selection along a continuum from a shortest measurement duration and a standard-precision measurement to a longest measurement duration and a highest-precision measurement. In this manner, the continuum allows the user to readily appreciate that moving one direction on the continuum will lead to shorter measurement duration and average-precision, while moving in the opposite direction on the continuum will lead to longer measurement duration and higher-precision. Each of the plurality of predictive modes of operation utilizes the same predictive algorithm for estimating the temperature of the subject before the thermometer reaches full equilibrium with the subject. By applying different data to the same predictive algorithm, temperature estimates of varying precision and data collection duration may be achieved.

As with the previously described method, the present method further comprises collecting 57 temperatures of the subject measured by the thermometer over time and applying 61 at least some of the collected measured temperatures to a predictive algorithm according to the predictive mode of operation selected by the user. In other words, this method includes several first modes of operation as defined by the previous method 21. The decision box 55 of FIG. 4 would therefore include additional collecting 57, applying 61, and determining 67 paths in parallel with the path depicted in FIG. 4. Each alternate path would correspond to a different mode having a different elapsed time limit or different data point limit than the remaining modes of operation. The method further comprises estimating 69 the temperature of the subject with the predictive algorithm based upon the selected predictive mode of operation.

As noted above with respect to the exemplary two-mode methods, the methods described herein are applicable to collecting temperatures of a subject and estimating the temperature of a subject. As would be understood by one skilled in the art, these methods are readily applicable to collecting temperatures of a patient and other subjects, such as animals, test apparatus, and other devices requiring measurement, without departing from the scope of embodiments of the invention.

Although embodiments of the invention have been described herein for use in the healthcare field, it will be appreciated that application of the present invention is not limited to the health care field. Embodiments of the invention may be used anywhere that fast response electronic thermometers are useful. For example, embodiments of the present invention may be used in industrial temperature measurement applications and various laboratory applications.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. Moreover, the use of "up", "down", "top" and "bottom" and variations of these terms is made for convenience, but does not require any particular orientation of the components.

As various changes could be made in the above without departing from the scope of the invention, it is intended that all matter contained in the above description and shown in the accompanying drawings shall be interpreted as illustrative and not in a limiting sense.

What is claimed is:

1. A method for determining the temperature of a subject with an electronic thermometer, said method comprising:
   receiving from a user of the electronic thermometer a selection between at least a first mode of operation of the thermometer and a second mode of operation of the thermometer;
   collecting temperatures of the subject measured by the thermometer over time;
   applying a first portion of the collected measured temperatures to a predictive algorithm according to the first mode of operation when the selection received from the user is for a first mode of operation;
   applying the first portion and a second portion of the collected measured temperatures to the same predictive algorithm according to the second mode of operation different from the first mode of operation when the selection received from the user is for a second mode of operation; and
   estimating the temperature of the subject with the predictive algorithm based upon the selected mode of operation before the electronic thermometer reaches equilibrium with the temperature of the subject.

2. A method as set forth in claim 1 wherein said applying the first portion of the collected measured temperatures to the predictive algorithm according to the first mode of operation comprises applying measured temperatures to the predictive algorithm collected over less time according to the first mode of operation as compared with the measured temperatures applied to the same predictive algorithm according to the second mode of operation.

3. A method as set forth in claim 1 wherein said collecting temperatures comprises collecting temperatures of a patient measured by the thermometer over time; and
   wherein said estimating the temperature comprises estimating the temperature of the patient with the predictive algorithm based upon the selected mode of operation.

4. A method as set forth in claim 1 further comprising determining if a time limit has elapsed; and
   switching from one of the first mode of operation and the second mode of operation selected by the user to a third mode of operation of the thermometer, the third mode of operation comprising a direct measurement mode adapted for collecting temperature information until the temperature of the temperature sensor equilibrates with the subject, whereby the thermometer determines the temperature in the third mode of operation more slowly but with greater precision, as compared with the first and second modes of operation.

5. A method as set forth in claim 1, further comprising collecting one or more additional temperatures of the subject measured by the thermometer when the estimated temperature is outside a predetermined temperature range.

6. A method as set forth in claim 1 wherein said estimating the temperature of the subject with the predictive algorithm based upon the selected mode of operation occurs more quickly when the first portion of the collected measured temperatures is applied to the predictive algorithm according to the first mode of operation as compared with when the first portion and the second portion of the collected measured temperatures are applied to the same predictive algorithm according to the second mode of operation.

7. A method as set forth in claim 6 wherein said estimating the temperature of the subject with the predictive algorithm based upon the selected mode of operation occurs with greater precision when the first portion and the second portion of the collected measured temperatures are applied to the predictive algorithm according to the second mode of operation as compared with when the first portion of the collected measured temperatures is applied to the same predictive algorithm according to the first mode of operation.

8. A method as set forth in claim 7 wherein said applying the first portion of the collected measured temperatures to the predictive algorithm according to the first mode of operation comprises applying fewer measured temperatures to the predictive algorithm according to the first mode of operation as compared with the number of measured temperatures applied to the same predictive algorithm according to the second mode of operation.

9. A method as set forth in claim 8 wherein said estimating the temperature of the subject with the predicted algorithm and the selected mode of operation comprises estimating the temperature of the subject according to the first mode of operation when the collecting temperatures of the subject over time has occurred continuously for at least a predetermined amount of time.

10. A method as set forth in claim 8 wherein said estimating the temperature of the subject with the predicted algorithm based upon the selected mode of operation comprises estimating the temperature of the subject according to the second mode of operation when the estimates of the predictive algorithm converge to a precision meeting a minimum threshold.

11. A method as set forth in claim 8 wherein said estimating the temperature of the subject with the predicted algorithm based upon the selected mode of operation comprises estimating the temperature of the subject according to the first mode of operation when the collecting temperatures of the subject over time has collected at least N number of measured temperatures.

12. A method as set forth in claim 11 wherein said estimating the temperature of the subject with the predicted algorithm based upon the selected mode of operation comprises estimating the temperature of the subject according to the first mode of operation when the collecting temperatures of the subject over time has collected at least fourteen measured temperatures.

13. A method for determining the temperature of a subject with an electronic thermometer, said method comprising:
   receiving from a user of the electronic thermometer a selection of one of a plurality of predictive modes of operation of the thermometer, the plurality of predictive modes of operation being selectable along a continuum from a shortest measurement duration and a standard-precision measurement to a longest measurement duration and a highest-precision measurement;
   collecting temperatures of the subject measured by the thermometer over time;
   applying at least some of the collected measured temperatures to a predictive algorithm determined according to the predictive mode of operation selected by the user, wherein a fewer number of the collected measured temperatures are applied to the predictive algorithm for standard-precision measurement than for the highest-precision measurement; and
   estimating the temperature of the subject with the predictive algorithm based upon the selected predictive mode of operation.

14. A method as set forth in claim 13 wherein said applying at least some of the collected measured temperatures to a predictive algorithm according to the selected predictive mode of operation comprises applying more measured temperatures to a same predictive algorithm according to each mode of operation as compared with the number of measured temperatures applied according to another mode of operation of the continuum associated with a shorter measurement duration.

15. A method as set forth in claim 13 wherein said applying at least some of the collected measured temperatures to a predictive algorithm according to the selected predictive mode of operation comprises applying a portion of collected measured temperatures collected over a longer period of time to a same predictive algorithm according to each mode of operation as compared with the portion of collected measured temperatures applied according to another mode of operation of the continuum associated with a shorter measurement duration.

16. A method as set forth in claim 13 wherein said receiving a selection of one of a plurality of predictive modes of operation comprises providing a selection element adjustable along the continuum of predictive modes of operation from the shortest measurement duration and the standard-precision measurement to the longest measurement duration and the highest-precision measurement.

17. A method as set forth in claim 13 further comprising determining if a time limit has elapsed; and
switching from one of the plurality of predictive modes of operation selected by the user to a direct mode of operation of the thermometer when said time limit has elapsed, the direct mode of operation comprising a direct measurement mode adapted for collecting temperature information until the temperature of the temperature sensor equilibrates with the subject, whereby the thermometer determines the temperature in the direct mode of operation more slowly but with greater precision, as compared with the first and second modes of operation.

* * * * *